United States Patent [19]
Fisher et al.

[11] Patent Number: 5,857,839
[45] Date of Patent: Jan. 12, 1999

[54] COMPRESSOR HAVING NOISE AND VIBRATION REDUCING REED VALVE

[75] Inventors: Ian Arthur Fisher; Norman Edward Davis, both of Plano, Tex.

[73] Assignee: Sanden Corporation, Gunma, Japan

[21] Appl. No.: 831,957

[22] Filed: Apr. 2, 1997

Related U.S. Application Data

[63] Continuation of Ser. No. 571,700, Dec. 13, 1995, abandoned, which is a continuation of Ser. No. 370,814, Jan. 10, 1995, abandoned, which is a continuation of Ser. No. 103,771, Aug. 10, 1993, abandoned.

[51] Int. Cl.$^6$ .............................. F04B 53/10; F16K 11/14
[52] U.S. Cl. .......................... 417/269; 417/569; 417/571; 137/855; 137/856; 137/512.15
[58] Field of Search ..................................... 417/269, 569, 417/571; 137/512.15, 855, 856, 857, 858

[56] References Cited

U.S. PATENT DOCUMENTS

| Re. 32,651 | 4/1988 | Rømer . | |
|---|---|---|---|
| 1,029,726 | 6/1912 | Sprado | 137/856 |

(List continued on next page.)

FOREIGN PATENT DOCUMENTS

| 3244003 | 5/1984 | Germany . |
| 55-163375 | 6/1979 | Japan . |

(List continued on next page.)

OTHER PUBLICATIONS

A.B. Barenboim, et al., *Effect of Roughness of the Channels of Low–Output Centrifugal Compressors on Their Performance*, Chemical and Petroleum Engineering (Jul.–Aug. 1974).

N. Yahata et al., Effect of Surface Working on the Fatigue Strength and Wear of A Hardened 13% Cr Stainless Steel, *Wear* (Aug. 2, 1982).

*Properties of High–Strength Valve Steels*, by Börje Johansson, Hans Nordberg, and John M. Thullen (undated).

*Primary Examiner*—Timothy Thorpe
*Assistant Examiner*—Ted Kim
*Attorney, Agent, or Firm*—Baker & Botts, L.L.P.

[57] ABSTRACT

A compressor comprising a compressor housing including a cylinder block forming seven cylinders equiangularly spaced apart and extending axially therein. Each of the cylinders is slidably fitted with a piston, and a drive mechanism is coupled to the pistons to reciprocate them within the cylinders to create fluid suction and discharge. The drive mechanism includes a drive shaft rotatably supported in the housing and coupling means for converting the rotary motion of the drive shaft to reciprocating motion of the pistons. The coupling means may also include a rotor coupled to the drive shaft and a slant plate having a surface disposed at an inclined angle relative to the drive shaft. A valve plate fabricated from steel having a hardness in a range of about 120 to 450 Hv seals the cylinders, such that fluid is compressed between each of the pistons and the valve plate. The compressor also includes a suction chamber and a discharge chamber, and a suction port and a discharge port formed through the valve plate connect each of the cylinders with the suction chamber and the discharge chamber, respectively. A discharge reed valve fabricated from spring steel is positioned on the valve plate opposite the cylinders and urged to contact the valve plate, thereby closing the discharge ports, such that the discharge reed valve is deflected to open the discharge ports by an increase in the pressure of the compressed fluid in the corresponding cylinders, whereby the compressed fluid is discharged from the cylinders into the discharge chamber. The discharge reed valve has roughened surfaces which extends around each of the discharge ports when the discharge ports are closed. The surfaces are roughened to a predetermined roughness in a range of about 5 to 25 μm $R_z$ and a mean peak distance in a range of about 75 to 200 μm $S_m$.

14 Claims, 7 Drawing Sheets

U.S. PATENT DOCUMENTS

| | | |
|---|---|---|
| 1,718,350 | 6/1929 | Greenwald et al. . |
| 2,065,062 | 12/1936 | Dugelay . |
| 2,095,842 | 10/1937 | Steenstrup . |
| 2,151,746 | 3/1939 | Cody . |
| 2,417,246 | 3/1947 | Ferguson . |
| 2,565,950 | 8/1951 | Crider . |
| 2,846,140 | 8/1958 | Kemper . |
| 3,751,005 | 8/1973 | Earley . |
| 3,830,254 | 8/1974 | Harrejwijne et al. . |
| 3,883,030 | 5/1975 | Mathews et al. ............. 220/204 |
| 3,911,546 | 10/1975 | Schrock et al. . |
| 4,011,029 | 3/1977 | Shimizu . |
| 4,089,348 | 5/1978 | Yoshida et al. . |
| 4,095,921 | 6/1978 | Hiraga et al. . |
| 4,290,455 | 9/1981 | Honda et al. . |
| 4,325,680 | 4/1982 | Bar ........................................ 417/569 |
| 4,360,319 | 11/1982 | Paget . |
| 4,507,059 | 3/1985 | Kobayashi et al. . |
| 4,516,602 | 5/1985 | Lüdenbach et al. . |
| 4,542,768 | 9/1985 | Harris . |
| 4,580,604 | 4/1986 | Kawaguchi et al. . |
| 4,642,037 | 2/1987 | Fritchman . |
| 4,652,217 | 3/1987 | Shibuya . |
| 4,723,572 | 2/1988 | Tuymer . |
| 4,778,360 | 10/1988 | Ikeda et al. . |
| 4,867,650 | 9/1989 | Ikeda et al. . |
| 4,893,993 | 1/1990 | Shimizu . |
| 4,900,238 | 2/1990 | Shimizu . |
| 4,978,285 | 12/1990 | De Costa ............................ 137/856 |
| 4,987,865 | 1/1991 | Schenkel . |
| 5,032,215 | 7/1991 | Dworak et al. . |
| 5,074,768 | 12/1991 | Kawamura et al. . |
| 5,078,582 | 1/1992 | Ohbayashi et al. . |
| 5,171,137 | 12/1992 | Todescat et al. ..................... 417/571 |
| 5,327,932 | 7/1994 | Rozek ............................. 137/512.15 |
| 5,451,148 | 9/1995 | Matsuzaki et al. ............... 137/543.21 |
| 5,454,398 | 10/1995 | Anderson ........................... 137/513.5 |

FOREIGN PATENT DOCUMENTS

| | | |
|---|---|---|
| 56-70172 | 5/1981 | Japan . |
| 56-80565 | 7/1981 | Japan . |
| 57-47071 | 3/1982 | Japan . |
| 57-57967 | 4/1982 | Japan . |
| 58-68562 | 4/1983 | Japan . |
| 58-158382 | 9/1983 | Japan . |
| 59-73673 | 4/1984 | Japan . |
| 60-237186 | 11/1985 | Japan . |
| 61-65970 | 4/1986 | Japan . |
| 63-282825 | 5/1990 | Japan . |
| 2-218875 | 8/1990 | Japan . |
| 468957 | 4/1993 | Sweden . |
| 01288421 | 8/1987 | U.S.S.R. . |
| 2091388 | 1/1981 | United Kingdom . |
| 2105821 | 3/1983 | United Kingdom ................. 137/855 |
| 93/04308 | 3/1993 | WIPO . |

COMPRESSOR HAVING NOISE AND VIBRATION REDUCING REED VALVE

This application is a continuation of application Ser. No. 08/571,700, filed Dec. 13, 1995 now abandoned, is a continuation of application Ser. No. 08/370,814, filed Jan. 10, 1995, now abandoned, is a continuation of application Ser. No. 08/103,771, filed Aug. 10, 1993, now abandoned.

BACKGROUND OF THE INVENTION

1. Field of the Invention

This invention relates to compressors which use reed valves, e g., spring or flapper valves, to control the discharge of a compressed fluid, and more particularly to compressors in which it is necessary to reduce noise and vibrations.

2. Description of the Related Art

It is known in the related art that compressors which compress fluid have a tendency to generate noise and vibration. A major cause of this noise generation is fluid over pressures generated during the compression process. Compression of the fluid takes place when the fluid is admitted into the compression chamber, e.g., the cylinder or pocket (s), and reduced in volume by the compressor. After compression, the fluid is discharged into the discharge chamber. In order to prevent the fluid from returning to the compression chamber, the compressor may be equipped with a reed valve which is positioned to close the discharge port. This valve opens or closes in response to the degree of compression of the fluid, i.e., the difference in pressure between the compression chamber and the discharge chamber across the valve. Such valves are described in U.S. Pat. No. 4,095,921 to Hiraga et al., the disclosure of which is incorporated herein by reference.

Such compressors also often are supplied with a lubricating oil which is fed into the compression chamber with the fluid to be compressed. This oil lubricates the operating components of the compressor and is essential for the longevity of the compressor. This oil, however, coats all working components of the compressor, including the reed valve(s) and the discharge port(s). Moreover, the temperature of the introduced fluid remains lower due to reduced friction, and the compressor parts are kept cooler and, therefore, last longer.

As described in U.S. Pat. No. 4,095,921, multi-cylinder compressors for the compression of fluids, such as refrigerants, are well known. The fluid introduced to the cylinders is compressed by means of a plurality of pistons which respectively reciprocate within the cylinders. In one type of compressor, the reciprocation of the pistons is produced by the cooperation of a rotating cam rotor and a wobble plate, which converts the rotation of a drive shaft to the desired reciprocation of the pistons. Slant plate-type compressors, such as swash or wobble plate-type compressors, which reciprocate pistons by converting the rotary motion of a cam rotor into nutational motion of a wobble plate are well known in the art. Such variable displacement wobble plate compressors are disclosed in Japanese Patent Application Publication No. 58-158382. Changing the angle of inclination of the wobble plate changes the stroke of the pistons and, therefore, changes the displacement volume of the cylinders.

In slant plate type compressors, both wobble plates and swash plates are disposed at a slant angle and drivingly couple the pistons to the drive shaft. Nevertheless, wobble plates nutate only. Swash plates both nutate and rotate. The term slant plate-type compressor will be used to refer to any type of compressor, including wobble and swash plate-types, which uses a slanted plate or surface in the drive mechanism. In reciprocating compressors, the pistons are coupled with a drive mechanism to convert the rotary motion of a drive shaft to reciprocating motion of each of the pistons and moves the pistons between axially spaced first or up-stroke and second or down-stroke positions, i.e., the "dead center positions." As a result, during one complete rotation of the slant plate, the piston moves in one direction, toward the first position, during which the volume of the cylinder(s) is increased, and the pressure in the cylinder(s) drops. During this movement, fluid enters the cylinder(s) via the suction port(s). When the piston moves in the opposite direction, toward the second position, during which the volume of the cylinder(s) is reduced, and the pressure in the cylinder rises; fluid is discharged from the cylinder(s) via the discharge port(s). In this type of compressor, the pistons come as near as possible to the valve plate, i.e., obtain as small as possible a tolerance between the piston and the valve plate, when the piston is at the second position. Nevertheless, the piston should not come into contact with valve plate. A minimum permissible tolerance must be maintained between the piston and the cylinder and the piston and the valve plate when the compressor is assembled, in order to achieve maximum compression efficiency.

As disclosed in U.S. Pat. No. 4,893,993 which is incorporated herein by reference, a conventional slant plate-type compressor includes a compressor housing, a front end plate, and a cylinder head. A cylinder block is formed in the compressor housing. The front end plate is attached to one end surface of the compressor housing to cover the opening of the housing. The cylinder head is disposed on the other end surface of the compressor housing and is attached to the cylinder block through a valve plate. A suction chamber and a discharge chamber are formed within the cylinder head adjacent to the valve plate. A plurality of cylinders are formed in the cylinder block, and pistons are reciprocatingly placed with the cylinders. A drive shaft extends within the compressor housing and is rotatably supported within an opening in the front end plate through a bearing. A drive mechanism for reciprocating the pistons is mounted on the drive shaft in the crank chamber. The drive mechanism includes a rotating portion and a mechanism for converting rotary motion into reciprocating motion. Further, each piston may be coupled to the drive mechanism through a connecting rod.

If the pressure in the cylinder greatly exceeds the desired discharged fluid pressure, peripheral equipment, e.g., receiver/dryer units and condensers, may be subjected to excessive pressures and damaged. Over pressures of about 30% may occur at a discharge pressure of about 350 psig, and about 60% at about 150 psig. Further, over pressures may generate noise because the reed valve(s) is brought into violent contact with the reed stops. See U.S. Pat. No. 4,095,921. The over pressure may result in noise generated by the throttling effect of the reed valve(s) on the discharge port(s) or reed valve flutter or "slapping" as the reed valve(s) strikes the valve stops. Such over pressures are due in large part to the presence of lubricant, e.g., lubricant mist, in the fluid to be compressed. When a reed valve is in the position in which it closes the discharge port, lubricant may be held between the reed valve and the valve plate and may generate an adhesive force between the valve and the plate. As a result, the reed valve may adhere to the valve plate and prevent the immediate release of pressure from the compression chamber. Although some adhesive force may be needed to maintain a desired seal between the reed valve(s) and the valve plate and to obtain a desired sealing of the cylinders, this force may become too large because the valve plate has a very smooth surface, e.g., in a range of about 0.2 to 0.8 $\mu$m $R_z$ ($R_z$ is the average height of surface peaks).

In order for the reed valve(s) to open and allow fluid to flow from the cylinder into the discharge chamber, the force applied to the valve(s) by the fluid must over come the adhesive and mechanical forces affecting the reed valve(s). The mechanical force must be applied to the reed valve(s) is determined in part by the physical dimensions of the valve (s) and the mechanical properties of the valve material, e.g., Young's Modulus (resiliency). The adhesive force between the reed(s) valve and the valve plate may be determined in part by the thickness of the oil film between the contacting surfaces of the valve(s) and the plate, the viscosity of the lubricating oil, and the area of the valve(s) in contact with the plate.

The combination of these forces must be overcome in order to open the valve(s). As mentioned above, it is the pressure of the fluid acting on the valve(s) that causes it to open. Over pressurization of the fluid occurs when the combination of these forces becomes large. See FIG. 7. This over pressure can not only cause high noise levels within the compressor, but also contributes to excessive wear on and wasted energy by the compressor. Excessive wear contributes to reduced compressor life, and the wasted energy generates heat which causes a lower Isentropic efficiency. Nevertheless, all the above parameters contributing to this situation are fixed for a specific type of compressor other than the surface finish of the valve(s). Further, although the discussion above has focused on reciprocating compressors, the same principles hold true for rotary compressors, such as vane and rolling piston compressors, and orbiting compressors, such as scroll compressors, that use discharge reed valves. Such a rotary compressor is described in U.S. Pat. No. 4,900,238 to Shimizu et al., the disclosure of which is incorporated herein by reference.

SUMMARY OF THE INVENTION

An object of this invention is to reduce noise and vibration in compressors utilizing reed valves without significantly reducing volumetric efficiency. This invention includes a valve design suitable for use on all compressors which employ reed valves to control the discharge of high pressure fluid. A further object of this invention is to improve the Isentropic efficiency of such compressors, reduce the power necessary to drive them, and improve the durability or longevity of the compressor. This invention includes a valve design which reduces the amount of power required to compress the fluid and, therefore, improves a compressor's Isentropic efficiency.

Specifically, an increase in roughness of the surfaces of the reed valves used to close the compressors' suction and discharge ports, as depicted in FIGS. 3–5, to a range of about 5 to 25 $\mu$m $R_z$ and a mean peak distance ($S_m$) in a range of about 75 to 200 $\mu$m significantly reduces the adhesive force between the reed valves and the valve plates and, hence, reduces the over pressure. Surface roughness may be determined by means of a profilometer. If surfaces are roughened in excess of about 25 $\mu$m $R_z$, however, the valves may leak during the suction portion of the compression process which may result in reduced compressor volumetric efficiency.

The compressor of the present invention comprises a compressor housing including a cylinder block forming at least one cylinder extending axially therein. For example, suitable compressors may include five or seven cylinders, angularly or equiangularly spaced apart, within the cylinder block. A piston is slidably fitted within each cylinder, and a drive mechanism is coupled to each piston to reciprocate the piston within each cylinder. The drive mechanism may include a drive shaft rotatably supported in the housing and coupling means for converting rotary motion of the drive shaft to reciprocating motion of each piston. The coupling means may comprise a rotor coupled to the drive shaft and a member having a surface disposed at an incline angle relative to the drive shaft. In this embodiment, the invention may be applied to various types of reciprocating compressors used for the compression of refrigerant fluid or other compressible fluids. Suitable compressors include fixed and variable stroke swash and wobble plate compressors, scotch yoke compressors, compressors employing crankshafts which transfer motion to the pistons by means of connecting rods, and the like.

A valve plate seals the cylinder(s), such that fluid may be compressed between each piston and the valve plate. The valve plate may be fabricated from steel having a hardness in a range of about 120 to 450 Vickers hardness (Hv). The compressor further comprises a suction chamber and a discharge chamber, and at least one suction port and discharge port are formed through the valve plate for placing each of the cylinders in communication with the suction chamber and the discharge chamber, respectively. At least one discharge reed valve is positioned on the valve plate on the side opposite the cylinder(s) and is urged, e.g., pressed or resiliently urged, to contact the valve plate, thereby closing the at least one discharge port. The discharge reed valve(s) may be fabricated from spring steel or other carbon steel with a hardness of at least about 500 Hv and a tensile strength of in a range of about 240 and 275K Lbf/in$^2$. The at least one discharge reed valve is deflected to open the discharge port(s) by an increase in the pressure of the compressed fluid in the corresponding cylinder, whereby the compressed fluid is discharged from each cylinder into the discharge chamber.

The at least one discharge reed valve has one or more roughened surfaces, each of which extends around a discharge port when the discharge port is closed by the reed valve. The surface(s) may be roughened by various processes, including shot blasting, vapor honing, grinding, pressing, chemical etching, knurling or machining, and the like. Each such surface has a predetermined surface roughness, e.g., in a range of about 5 to 25 $\mu$m $R_z$ and a mean peak distance in a range of about 75 to 200 $\mu$m $S_m$.

In another embodiment, the compressor may further comprise at least one suction reed valve positioned on the valve plate within each of the cylinder(s) and urged, e.g., pressed or resiliently urged, to contact the valve plate, thereby closing the at least one suction port. The at least one suction reed valve is deflected to open the at least one suction port by a decrease in the pressure of the fluid, such as that caused by the reciprocating motion of the piston to the first position, in the corresponding cylinder. Thus, additional fluid is drawn from the suction chamber into that cylinder. The at least one suction reed valve also has one or more roughened surfaces, each of which extends around a suction port when the suction port is closed by the reed valve. As with the discharge reed valve(s), the surface(s) may be roughened by various processes, including shot blasting, vapor honing, grinding, pressing, chemical etching, knurling or machining, and the like. Each such surface has a predetermined surface roughness, e.g., in a range of about 5 to 25 $\mu$m $R_z$ and a mean peak distance in a range of about 75 to 200 $\mu$m $S_m$.

In yet another embodiment, the invention may be applied to various types of rotary and orbiting compressors which also may be used for the compression of refrigerant fluid or other compressible fluids. Suitable compressors include fixed and variable vane and scroll compressors, fixed and variable rolling piston compressors, and the like. Such a rotary-type compressor may comprise a compressor housing including a valve plate, rotary means for defining at least one pair of sealed off fluid pockets, and a drive mechanism operatively connected to the rotary means, whereby operation of the rotary means causes the volume of the fluid pockets to change to compress fluid in the pockets. At least one discharge port is formed through the valve plate, and at least one discharge reed valve is positioned on the valve plate and urged, e.g., pressed or resiliently urged, to contact the valve plate, thereby closing the at least one discharge port. When the at least one discharge reed valve is deflected to open the at least one discharge port by an increase in the pressure of the compressed fluid in the pockets, the compressed fluid is discharged from the pockets into the discharge chamber. As in the embodiments disclosed above, the at least one discharge reed valve has one or more roughened surfaces, each of which extends around a discharge port when the discharge port is closed by the reed valve.

In one embodiment of this invention as applied to an orbiting type compressor, the compressor may comprise a compressor housing including a fixed scroll disposed within the housing and having a first end plate i.e., a valve plate, and a first spiral element extending therefrom. The valve plate divides the housing into a suction chamber, into which the first element extends, and a discharge chamber. The compressor housing further includes an orbiting scroll having a second end plate and a second spiral element extending therefrom. The first and second spiral elements interfit at an angular and a radial offset to form a plurality of line contacts which define at least one pair of sealed off fluid pockets. A drive mechanism is operatively connected to the orbiting scroll to effect orbital motion of the orbiting scroll, and rotation prevention means prevent the rotation of the orbiting scroll during orbital motion, whereby the volume of the fluid pockets changes to compress fluid in the pockets.

At least one discharge port is formed through the valve plate, and at least one discharge reed valve is positioned on the valve plate and urged, e.g., pressed or resiliently urged, to contact the valve plate, thereby closing the at least one discharge port. When the at least one discharge reed valve is deflected to open the at least one discharge port by an increase in the pressure of the compressed fluid in the pockets, the compressed fluid is discharged from the pockets into the discharge chamber. The at least one discharge reed valve has one or more roughened surfaces, each of which extends around a discharge port when the discharge port is closed by the reed valve.

Although reed valves generally have been manufactured to be flat, e.g., seldom varying more than a range of about 0.05 to 0.15 mm across the entire surface of the valve, a further reduction in noise and vibration may be obtained by imparting a slight bend, away from the valve plate, to the tip of the valve. This may be accomplished during the surface roughening process, e.g., by applying the shot blasting to the tips of a partially supported reed valve. In this embodiment, the slight bend allows the valve to begin to open earlier, thus preventing the development of an over pressure. The bent surface of the tip may vary in a range of about 0.05 to 0.25 mm, but will be greater that any variations in the flatness of the reed valve.

Other objects, advantages, and features will be apparent when the detailed description of the invention and the drawings are considered.

DETAILED DESCRIPTION OF PREFERRED EMBODIMENTS

Figure 1A:
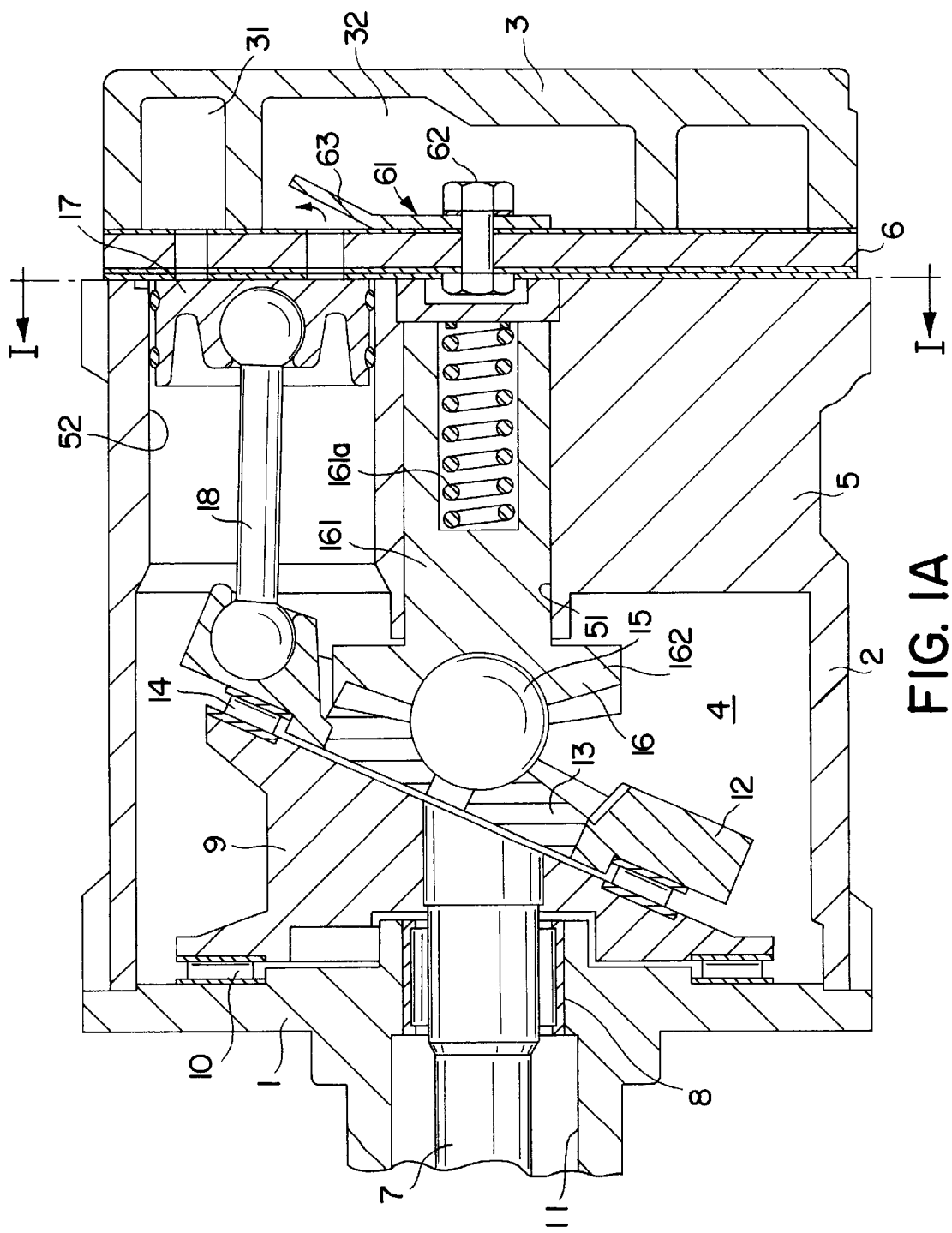
FIG. 1A depicts a cross-sectional view of a reciprocating refrigerant compressor in accordance with one embodiment of this invention.

Referring to FIG. 1A, a refrigerant compressor in accordance with one embodiment of this invention is depicted. The compressor includes front end plate 1, compressor housing 2, a cylinder head 3, and a valve plate 6. Crank chamber 4 and cylinder block 5 are disposed within compressor housing 2 adjacent each other. Front end plate 1 is attached to one end of compressor housing 2 to cover the opening of housing 2. The other end of cylinder block 5 is covered by cylinder head 3 through valve plate 6. Cylinder head 3 and valve plate 6 are disposed on housing 2 through screws disposed through holes 54 and 55 disposed in cylinder head 3, and housing 2 and valve plate 6, respectively. See FIGS. 1A, 2, and 6.

Drive shaft 7 is rotatably supported within opening 11 of front end plate 1 through bearing 8 and extends within crank chamber 4. A wedge-shaped rotor 9 is affixed on a inner end of drive shaft 7 to be rotated therewith. Rotor 9 is axially rotatably supported on the inner end surface of front end plate 1 through thrust bearing 10. Rotor 9 is also provided with a slant surface proximate to the surface of a wobble plate 12 with thrust bearings 14 disposed therebetween.

Wobble plate 12 is nutatably, but nonrotatably, supported on a hinge ball 15 which is seated at one end of a supporting rod 16. Supporting rod 16 includes a shank portion 161 and a bevel gear portion 162 which has a seat for hinge ball 15 at its center. Shank portion 161 extends into a central bore 51 formed in the central portion of cylinder block 5. Supporting rod 16 does not rotate and prevents wobble plate 12 from rotating by engaging bevel gear portion 162 with bevel gear 13 mounted on wobble plate 12. A spring 161a urges supporting rod 16 to the left.

Figure 2:
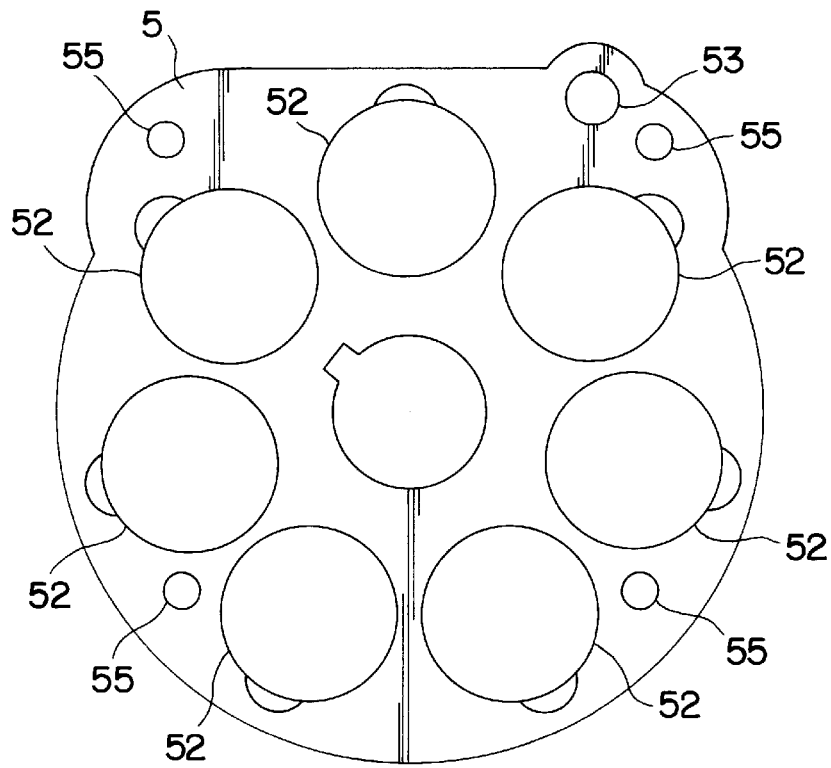
FIG. 2 depicts a cross-sectional view of the compressor of FIGS. 1A and 1B taken along line I—I.

A suction chamber 31 and a discharge chamber 32 are formed within cylinder head 3. In this embodiment, discharge chamber 32 is located at the center of cylinder head 3 adjacent to the side of valve plate 6 opposite the cylinders, and suction chamber 31 surrounds discharge chamber 32. A plurality of cylinders 52, only one of which is depicted in FIG. 1A, are equiangularly formed and spaced in cylinder block 5, and piston 17 is slidably fitted within each cylinder 52. Referring to FIG. 2, a cross-sectional view of the compressor of FIG. 1A taken along line I—I discloses a preferred embodiment of the compressor having seven equi-angularly spaced cylinders 52. Piston 17 is coupled to wobble plate 12 by connecting rod 18 through ball joints.

Figure 1B:
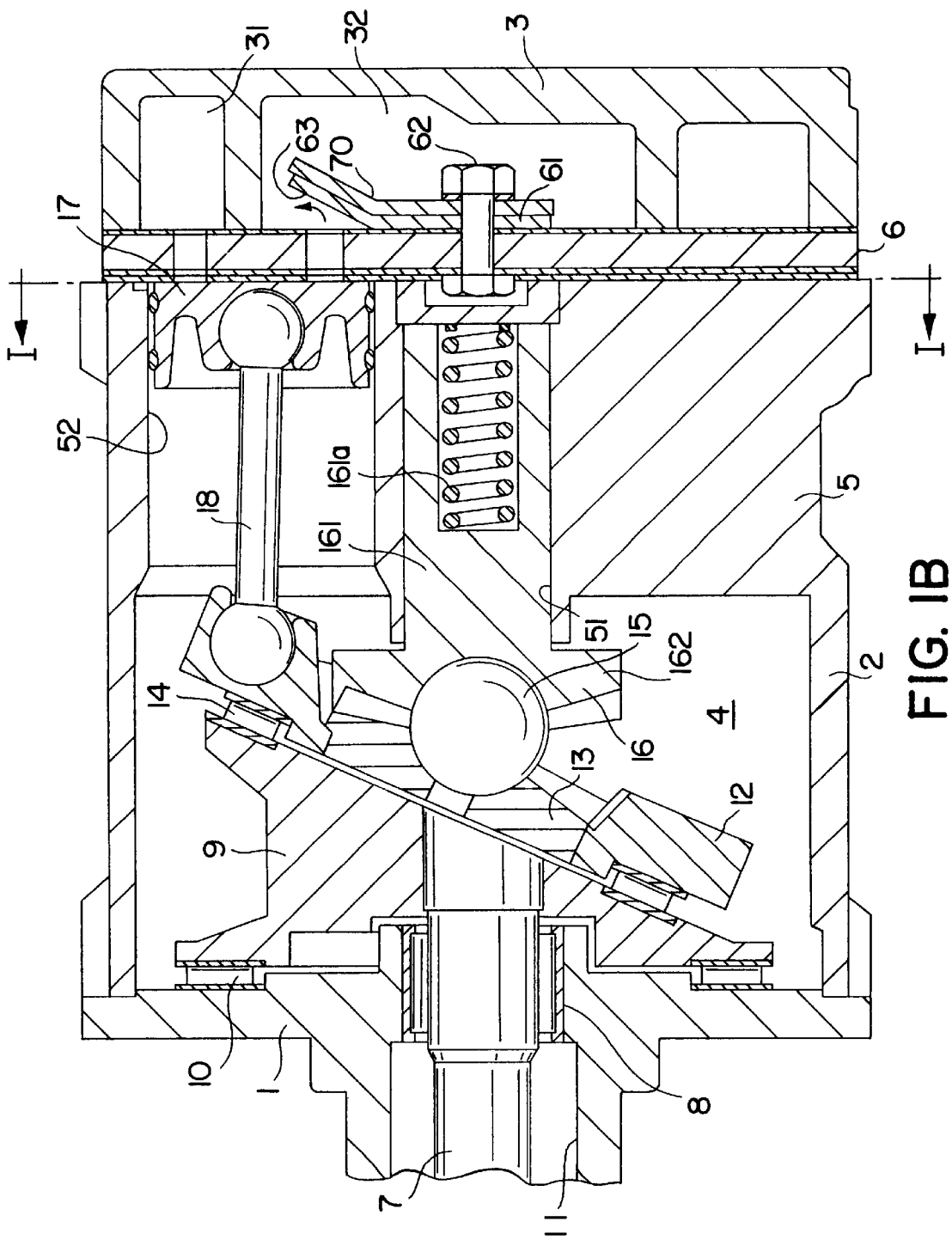
FIG. 1B depicts a cross-sectional view of a reciprocating refrigerant compressor having a reed valve stop in accordance with another embodiment of this invention.

A reed valve 61 is mounted centrally on valve plate 6 within discharge chamber 32, as depicted in FIG. 1A. Reed valve 61 includes mounting bolt 62 and a plurality of tips 63 (only one tip 63 is depicted in FIGS. 1A and 1B corresponding to the one depicted cylinder 52). Each tip 63 opens and closes the discharge port of a respective cylinder. Because discharge chamber 32 is formed in the radially central portion of cylinder head 3, all tips 63 for each of cylinders 52 may be fixed at one central location by bolt 62. This single discharge reed valve 61, integrally having a plurality of tips 63 and requiring only one bolt 62 to attach the reed valve on valve plate 6, simplifies the assembly of the compressor and reduces the number of required parts.

Figure 3A:
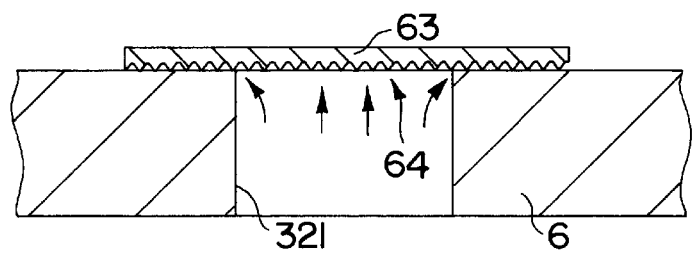
FIGS. 3A and 3B are partial enlarged cross-sectional views of a valve plate and a discharge reed valve according to the present invention, depicting the closed and open positions of the reed valve, respectively.
Figure 3B:
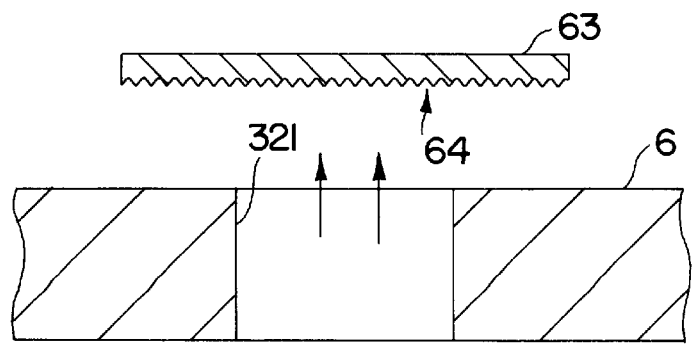
Figure 4:
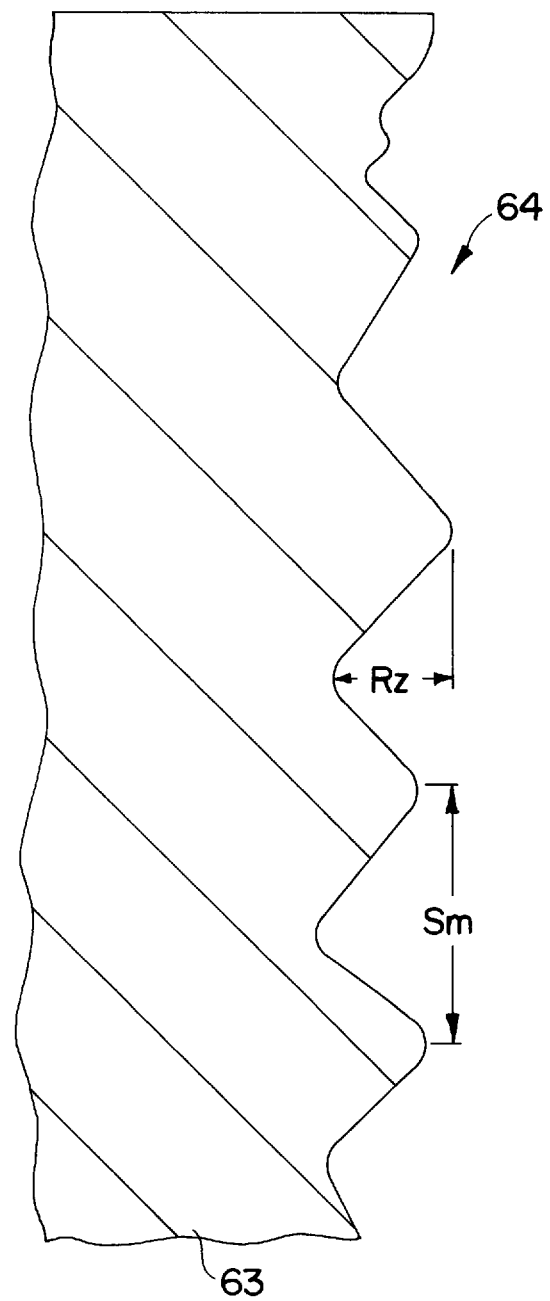
FIG. 4 depicts a cross-sectional view of the roughened surface of the discharge reed valve.

Referring to FIG. 3A, tip 63 is shown in the closed position sealing a discharge port 321 in valve plate 6. The surface 64 of tip 63 has been roughened to a predetermined surface roughness, preferably in a range of about 5 to 25 μm $R_z$. See FIG. 4. As piston 17 approaches its second position, pressure within cylinder 52 increases. The adhesive and mechanical, e.g., resilient, forces holding the reed valve 61 over discharge port 321 are overcome, and tip 63 moves away from valve plate 6 and discharge port 321. See FIG. 3B. This allows fluid to pass from cylinder 52 into discharge chamber 32 (and out of the compressor).

Preferably, the roughened surfaces 64 are obtained by a shot blasting process in which fine particles are "shot" from an compressed air gun at tips 63 to form surfaces 64. The kinematic energy of the particles striking tips 63 can be controlled by varying the speed of flow of the compressed air. By controlling the kinematic energy, the roughness ($R_z$) of surface 64 can be controlled. Further, by varying the shape and size of the particles shot at surface 64, the mean peak distance ($S_m$) can be controlled. See FIG. 4. Preferably, particles will be chosen which result in a length in a range of about 75 to 200 μm, as determined using a profilometer with a 25% filter in operation.

Figure 5:
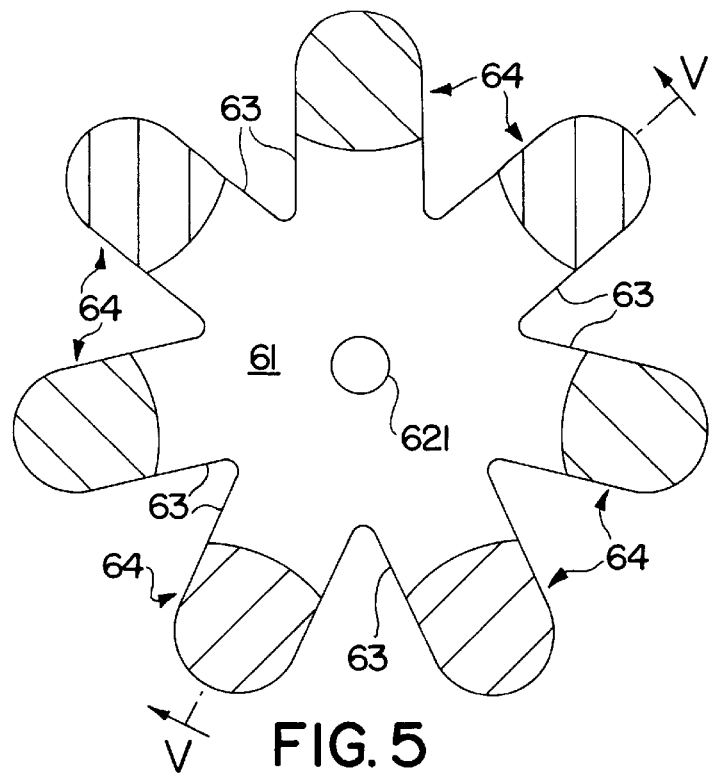
FIG. 5 depicts a plan view of a discharge reed valve, according to the present invention, for use with a compressor having seven cylinders.

While this invention is suitable for use with reciprocating compressors having various cylinder configurations, a preferred embodiment is a wobble plate-type compressor having seven equiangularly spaced cylinders. FIG. 5 depicts a single reed valve 61 including seven tips 63 that extend radially from the center of reed valve 61. Reed valve 61 is fixed to valve plate 6 by bolt 62 through hole 621. Preferably, reed valve 61 will be fabricated from carbon steel and will have a hardness of at least about 500 Hv and a tensile strength in a range of about 240 to 275K Lbf/in². Specifically, reed valve 61 is preferably made from spring steel. Valve plate 6, however, is preferably fabricated from carbon steel having a hardness in a range of about 120 to 450 Hv. Because reed valve 61 is significantly harder that valve plate 6, reed valve 61 exhibits little wear despite repeated contact with valve plate 6, thus improving the longevity of the compressor.

Figure 6:
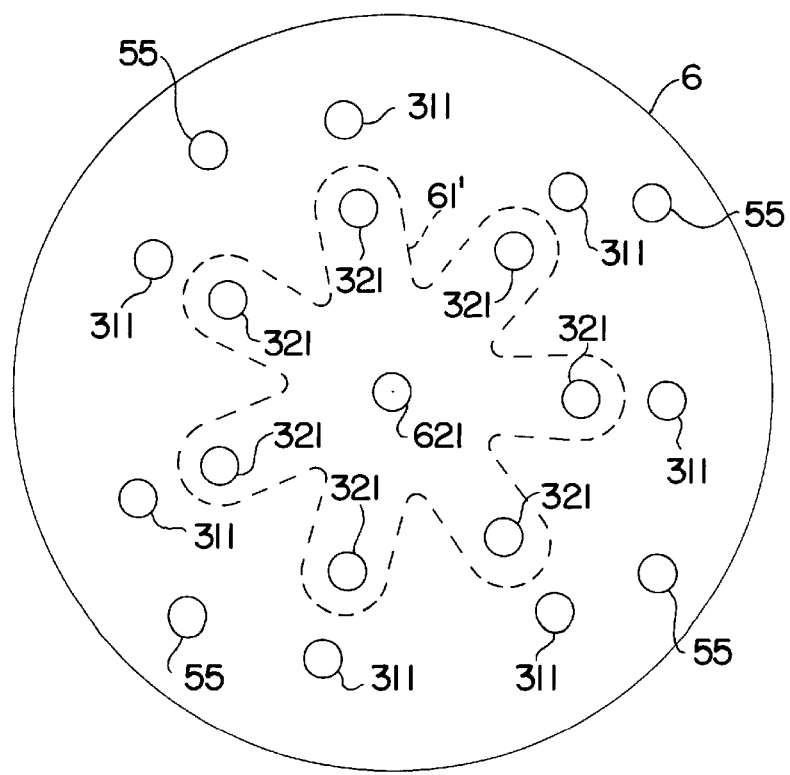
FIG. 6 depicts a plan view of the valve plate corresponding to the discharge reed valve of FIG. 5.

Each tip 63 controls the closing and opening of a single discharge port 321. Referring to FIG. 6, the dotted-line representation of reed valve 61' covers discharge ports 321, but leaves suction ports 311 uncovered. This configuration is especially suited for the inclusion of a suction reed valve. Such a valve is disclosed in U.S. Pat. No. 4,011,029 to Shimizu, the disclosure of which is incorporated herein by reference. Moreover, because each tip 63 can flex independently to open or close its corresponding discharge port 321, reed valve 61 can control the discharge of fluid from all seven cylinders. In this embodiment, tips 63 of reed valve 61 will open and close sequentially, as wobble plate 12 nutates causing the various pistons 17 to cycle between their first and second positions.

Figure 8:
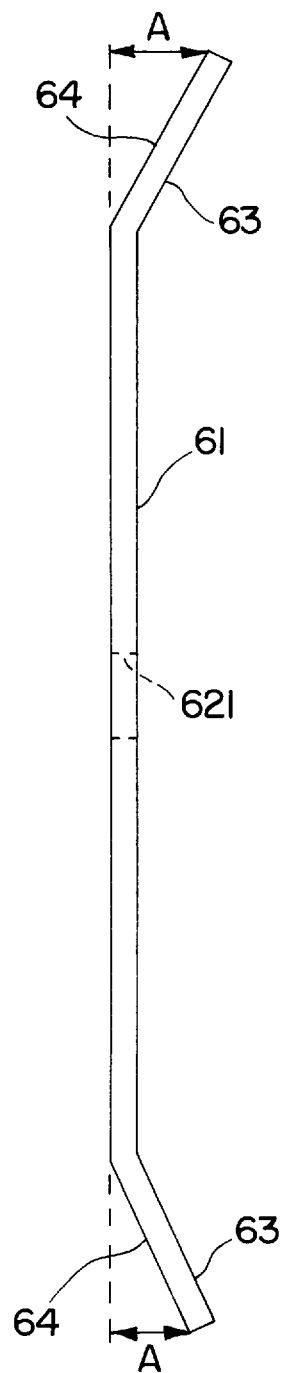
FIG. 8 is a cross-sectional view of the discharge reed valve of FIG. 5 taken along line V—V with the tip bending modification.

The effects of over pressure of the compressed fluid can be further reduced or avoided by modifying tips 63 of reed valve 61, so that roughened surface 64 bends slightly away from valve plate 61. Reed valves, such as reed valve 61, have been manufactured with a relatively precise "flatness" specification. Variations have been limited to bends in a range of about 0.05 to 0.15 mm across the surface of the reed valve. By bending tips 63 away from valve plate 6, reed valve 61 can disengage from valve plate 6 more readily, e.g., overcome the adhesive and mechanical forces more easily, and begin to uncover discharge port 321 earlier in the compression process. As depicted in FIG. 8, tips 63 may be manufactured with a bend A in the range of about 0.05 to 0.25 mm across surfaces 64 of tips 63.

Figure 7:
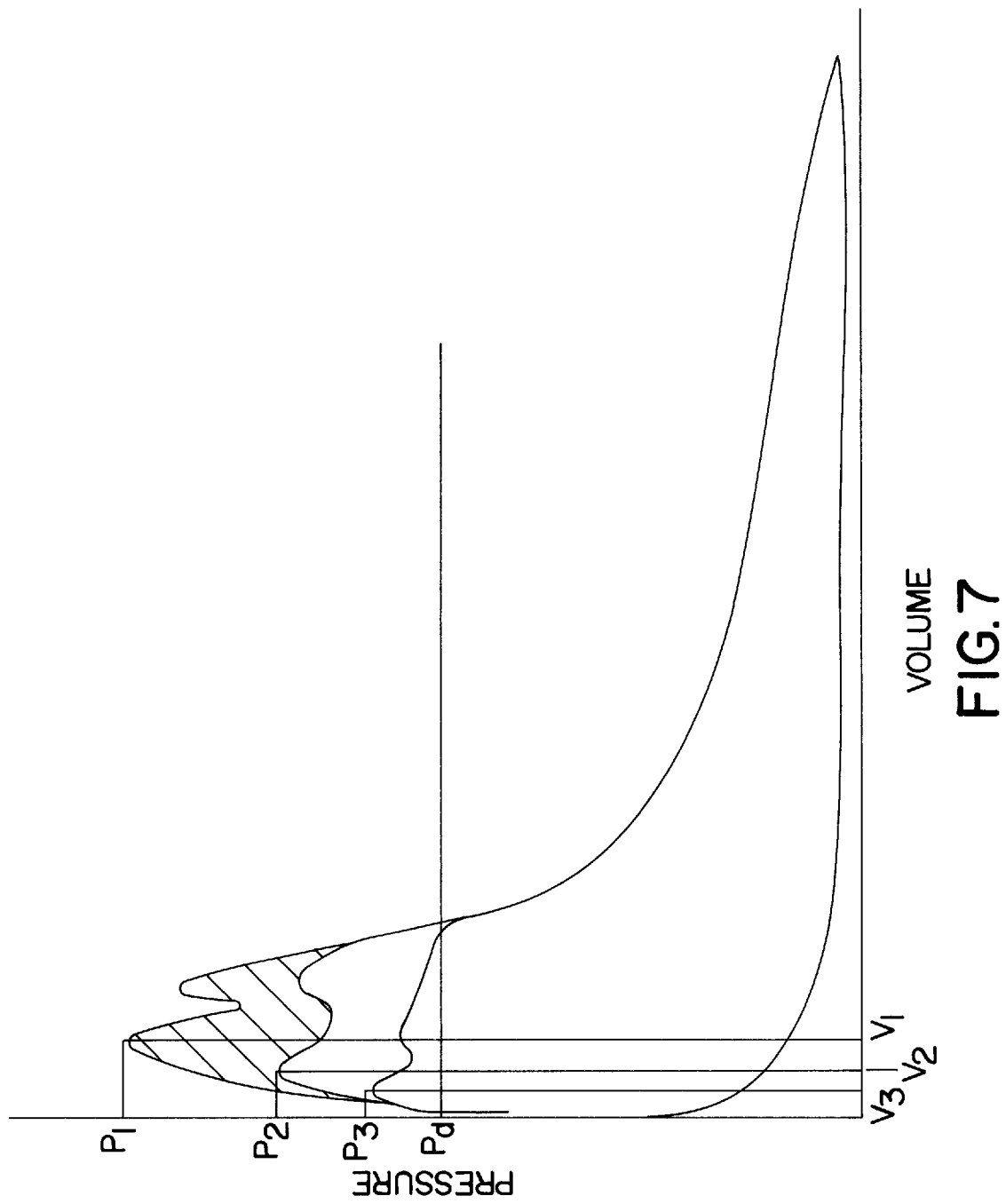
FIG. 7 is a graph depicting the relationship between pressure and volume in a reciprocating compressor provided with a discharge reed valve according to this invention.

Referring to FIG. 7, the graph shows the relationship between the over pressures encountered in related art reciprocating compressors ($P_1$) and those encountered in compressors according to the present invention with the tip bending modification ($P_3$), and without the modification ($P_2$). No specific pressure values are provided in this graphic representation. As noted above, all of the parameters contributing to over pressure, the actual amount of over pressure experienced, and the noise and vibration resulting from over pressure are dependent upon the specific compressor and its operating conditions. Nevertheless, the graph accurately represents the relationship between measured over pressures when the configuration of the reed valve is varied in accordance with this invention.

The graph suggests that the discharge pressure ($P_d$) measured in discharge chamber 32 and the volume of fluid compressed remain relatively constant. According to FIG. 7, however, a related art compressor discharges a volume of fluid of $V_1$ and experiences an over pressure of $P_1$; a compressor according to the present invention discharges a slightly smaller volume of fluid of $V_2$, but only experiences an over pressure of $P_2$; a compressor according to the present invention which also has the tip bending modification discharges a still smaller volume of $V_3$ and experiences a still smaller over pressure of $P_3$. The thatched area between the curve for the related art compressor and the present invention represents the reduction in work obtained by modifying the surfaces 64 of reed valve 61. The tip bending modification, therefore, not only lowers the over pressure, but further reduces the amount of work done by the compressor.

As indicated above, the invention can be applied to various types of compressor including reciprocating and rotary and orbiting compressors. The invention will be further clarified by a consideration of the following example, which is intended to be purely exemplary of the use of the invention. Tests were performed on a reciprocating compressor with seven cylinders manufactured by the Sanden Corporation, Model No. SD709P. The compressor was operated at about 2,000 RPM and generated a suction pressure of about 25 psig, and a discharge pressure ($P_d$) of about 250 psig. Operation of the compressor resulted in an over pressure ($P_1$) of about 350 psig. When the invention was applied to the compressor, the surfaces of a reed valve were roughened in a range of about 5 to 25 μm $R_z$ and a mean peak distance in a range of about 75 to 200 μm $S_m$. As a result, the over pressure ($P_2$) was reduced to about 290 psig. When the tip bending modification was also applied to the compressor to cause the valve tip to bend in a range of about 0.05 to 0.25 mm, an over pressure ($P_3$) of about 275 psig was obtained. This reduction in over pressure is beneficial toward reducing the forces within the compressor which improves the compressor's durability or longevity and reduces generated noise.

The application of the invention to other types of compressors, e.g., other reciprocating, rotary, and orbiting compressors, equipped with discharge reed valves or suction reed valves, or both, would be readily understood by those skilled in the art. See U.S. Pat. Nos. 4,011,029; 4,095,921; and 4,900,238. Moreover, numerous characteristics, advantages, and embodiments of the invention have been described in detail in the foregoing description with reference to the accompanying drawings. Nevertheless, the disclosure is illustrative only, and the invention is not limited to the precise depicted embodiments. Various changes and modifications may be effected therein by one skilled in the art without departing from the scope or spirit of the invention.

We claim:

1. A compressor comprising:
   a compressor housing including a cylinder block forming at least one cylinder extending axially therein;
   a piston slidably fitted within said at least one cylinder;
   a drive mechanism coupled to each said piston to reciprocate said piston within said at least one cylinder, said drive mechanism including a drive shaft rotatably supported in said housing and coupling means for converting rotary motion of said drive shaft to reciprocating motion of said piston;
   a valve plate sealing said at least one cylinder, such that fluid is compressed between said piston and said valve plate;
   a suction chamber and a discharge chamber;
   at least one suction port and discharge port formed through said valve plate for placing said at least one cylinder in communication with said suction chamber and said discharge chamber, respectively; and
   at least one discharge reed valve positioned on said valve plate opposite said at least one cylinder and urged to contact said valve plate, thereby closing said at least one discharge port, such that said at least one discharge reed valve is deflected to open said at least one discharge port by an increase in the pressure of the compressed fluid in said at least one cylinder, whereby the compressed fluid is discharged from each cylinder to said discharge chamber, said at least one discharge reed valve having at least one roughened surface which extends around said at least one discharge port when said at least one discharge port is closed and which has a predetermined surface roughness; wherein said predetermined surface roughness is in a range of about 5 to 25 μm $R_z$ and a mean peak distance in a range from greater than 100 μm $S_m$ to about 200 μm $S_m$ and wherein said at least one roughened surface of said at least one discharge reed valve is significantly harder than a smooth, contact surface of said valve plate.

2. The compressor of claim 1 wherein said at least one discharge reed valve has a hardness of at least about 500 Hv and a tensile strength of in a range of about 240 and 275K Lbf/in².

3. The compressor of claim 2 further comprising at least one suction reed valve positioned on said valve plate within said at least one cylinder and urged to contact said valve plate, thereby closing said at least one suction port, such that said at least one suction reed valve is deflected to open said at least one suction port by a decrease in the pressure of the compressed fluid in said at least one cylinder, whereby the compressed fluid is drawn from said suction chamber into said cylinder; said at least one suction reed valves having at least one roughened surface which extends around said at least one suction port when said at least one suction port is closed and which has a predetermined surface roughness.

4. The compressor of claim 2 wherein a tip of said at least one discharge reed valve is bent by a predetermined amount away from said valve plate.

5. The compressor of claim 1 further comprising at least one suction reed valve positioned on said valve plate within said at least one cylinder and urged to contact said valve plate, thereby closing said at least one suction port, such that said at least one suction reed valve is deflected to open said at least one suction port by a decrease in the pressure of the compressed fluid in said at least one cylinder, whereby the compressed fluid is drawn from said suction chamber into said cylinder; said at least one suction reed valves having at least one roughened surface which extends around said at least one suction port when said at least one suction port is closed and which has a predetermined surface roughness.

6. The compressor of claim 5 wherein a tip of said at least one discharge reed valve is bent by a predetermined amount away from said valve plate.

7. A compressor comprising:
   a compressor housing including a cylinder block forming a plurality of cylinders angularly spaced apart and extending axially therein;
   a piston slidably fitted within each of said cylinders;
   a drive mechanism coupled to said pistons to reciprocate said pistons within said cylinders for fluid suction and discharge, said drive mechanism including a drive shaft rotatably supported in said housing and coupling means for converting rotary motion of said drive shaft to reciprocating motion of said pistons, including a rotor coupled to said drive shaft and a slant plate having a surface disposed at an inclined angle relative to said drive shaft;
   a valve plate fabricated from steel having a hardness in a range of about 120 to 450 Hv and sealing said cylinders, such that fluid is compressed between each of said pistons and said valve plate;
   a suction chamber and a discharge chamber;
   a plurality of suction ports and discharge ports formed through said valve plate for placing each of said cylinders in communication with said suction chamber and said discharge chamber, respectively; and
   a discharge reed valve fabricated from spring steel, removably positioned on said valve plate opposite said cylinders, and urged to contact said valve plate, thereby closing said discharge ports, such that said discharge reed valve is deflected to open said discharge ports by an increase in the pressure of the compressed fluid in said corresponding cylinder, whereby the compressed fluid is discharged from said cylinders to said discharge chamber; said discharge reed valve having a roughened surface which extends around each of said discharge ports when said discharge ports are closed and which has a surface roughness in a range of about 5 to 25 μm $R_z$ and a mean peak distance in a range from greater than 100 µm $S_m$ to about 200 µm $S_m$; wherein said at least one roughened surface of said at least one discharge reed valve is significantly harder than a smooth, contact surface of said valve plate.

8. The compressor of claim 7 further comprising a suction reed valve positioned on said valve plate within each of said cylinders and urged to contact said valve plate, thereby closing each of said suction port, such that said suction reed valve is deflected to open each of said suction ports by a decrease in the pressure of the compressed fluid in said corresponding cylinder, whereby fluid is drawn from said suction chamber into said cylinder; each of said suction reed valves having at least one roughened surface which extends around each of said suction ports, respectively, when said suction port is closed and which has a predetermined surface roughness.

9. The compressor of claim 8 wherein a tip of each of said discharge reed valves is bent by a predetermined amount away from said valve plate.

10. A compressor comprising:
a compressor housing including a fixed scroll disposed within said housing and having a valve plate and a first spiral element extending therefrom, said valve plate dividing said housing into a suction chamber, into which said first element extends, and a discharge chamber, and an orbiting scroll having a having a second end plate and a second spiral element extending therefrom, said first and second spiral elements interfitting at an angular and a radial offset to form a plurality of line contacts which define at least one pair of sealed off fluid pockets;

a drive mechanism operatively connected to said orbiting scroll to effect orbital motion of said orbiting scroll;

rotation prevention means for preventing the rotation of said orbiting scroll during orbital motion whereby the volume of said fluid pockets changes to compress fluid in the pockets;

at least one discharge port formed through said valve plate; and at least one discharge reed valve positioned on said valve plate and urged to contact said valve plate, thereby closing said at least one discharge port, such that said at least one discharge reed valve is deflected to open said discharge port by an increase in the pressure of the compressed fluid in said pockets, whereby the compressed fluid is discharged from said pockets to said discharge chamber; said at least one discharge reed valve having at least one roughened surface which extends around said discharge ports when said at least one discharge port is closed and has a predetermined surface roughness; wherein said predetermined surface roughness is in a range of about 5 to 25 µm $R_z$ and a mean peak distance in a range from greater than 100 µm $S_m$ to about 200 µm $S_m$; wherein said at least one roughened surface of said at least one discharge reed valve is significantly harder than a smooth, contact surface of said valve plate.

11. The compressor of claim 10 wherein said at least one discharge reed valve has a hardness of at least about 500 Hv and a tensile strength of in a range of about 240 and 275K Lbf/in$^2$.

12. The compressor of claim 11 wherein a tip of said at least one discharge reed valve is bent by a predetermined amount away from said valve plate.

13. The compressor of claim 10 wherein a tip of said at least one discharge reed valve is bent by a predetermined amount away from said valve plate.

14. A compressor comprising:
a compressor housing including a cylinder block forming at least one cylinder extending axially therein;

a piston slidably fitted within said at least one cylinder;

a drive mechanism coupled to each said piston to reciprocate said piston within said at least one cylinder, said drive mechanism including a drive shaft rotatably supported in said housing and coupling means for converting rotary motion of said drive shaft to reciprocating motion of said piston;

a valve plate sealing said at least one cylinder, such that fluid is compressed between said piston and said valve plate;

a suction chamber and a discharge chamber;

at least one suction port and discharge port formed through said valve plate for placing said at least one cylinder in communication with said suction chamber and said discharge chamber, respectively; and at least one discharge reed valve removably positioned on said valve plate opposite said at least one cylinder and urged to contact said valve plate, thereby closing said at least one discharge port, such that said at least one discharge reed valve is deflected to open said at least one discharge port by an increase in the pressure of the compressed fluid in said at least one cylinder, whereby the compressed fluid is discharged from each cylinder to said discharge chamber, said at least one discharge reed valve having at least one roughened surface which extends around said at least one discharge port when said at least one discharge port is closed and which has a predetermined surface roughness wherein said at least one roughened surface of said at least one discharge reed valve is significantly harder than a smooth, contact surface of said valve plate; wherein said compressor further comprising a plurality of discharge ports and a plurality of discharge reed valves each having a tip wherein said tip of each of said discharge reed valves is bent by a predetermined amount away from said valve plate and wherein each of said tips flexes independently to open and close a corresponding one of said discharge ports in sequence, and wherein said tips include said roughened surfaces of each of said reed valves and said roughened surfaces are bent away from said valve plate.

* * * * *